May 6, 1941. J. H. ROBERTS 2,240,894
SPRING SHACKLE ASSEMBLY
Filed June 19, 1939
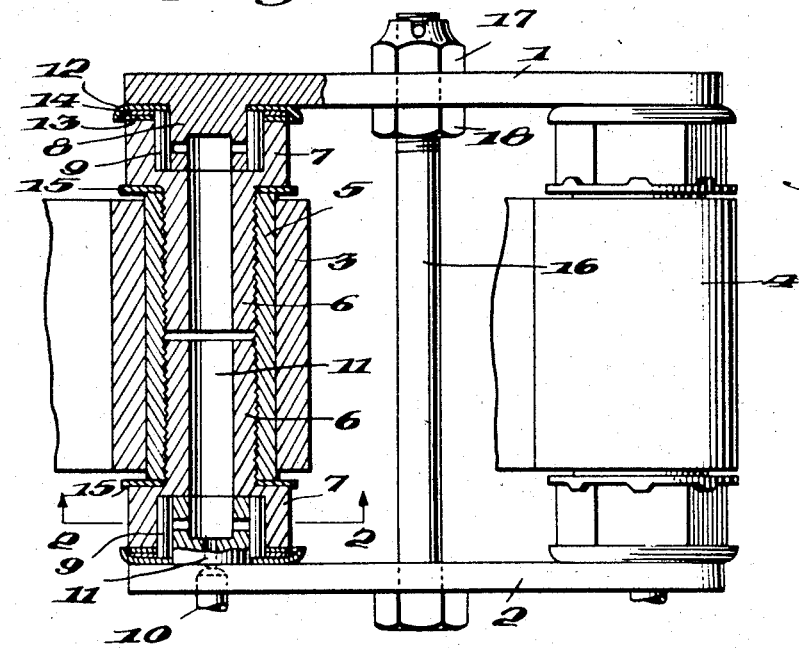
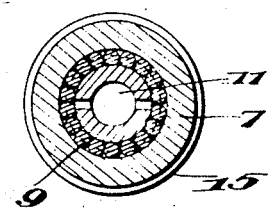
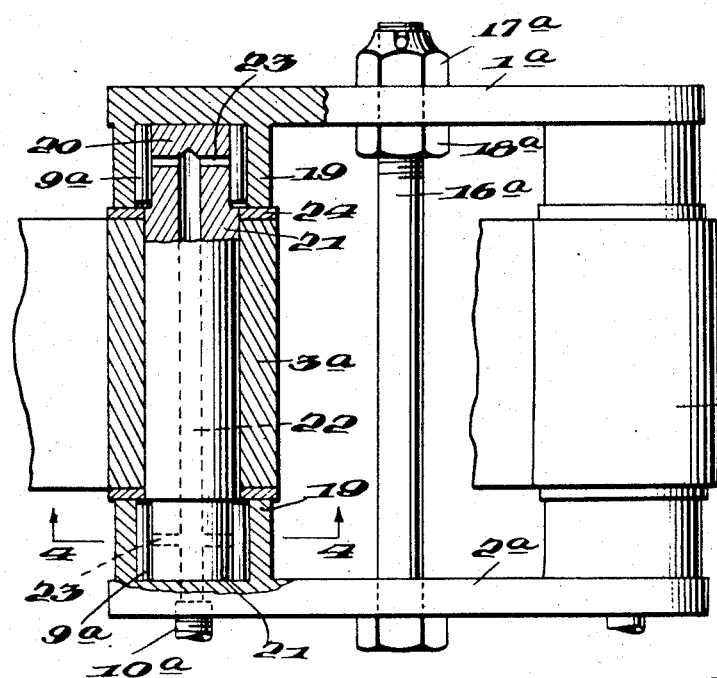
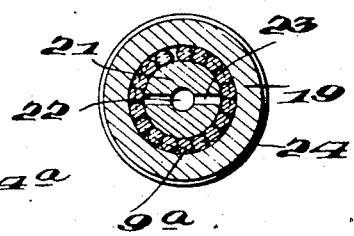
Inventor
JAMES H. ROBERTS, Patented May 6, 1941

2,240,894

UNITED STATES PATENT OFFICE 2,240,894

SPRING SHACKLE ASSEMBLY

James H. Roberts, Osceola, Ark.

Application June 19, 1939, Serial No. 279,955

1 Claim. (Cl. 267—54)

My invention consists in new and useful improvements in spring shackles of the type generally employed in securing the springs of an automobile or the like to the chassis or frame of the vehicle.

The object of the present invention is to provide a spring shackle assembly which is simple yet durable in construction, and wherein a minimum of friction and wear is insured.

Another object of my invention resides in the provision of roller bearings at the points of relative movement and a novel means for retaining the same in place.

A still further object of my invention is to provide a spring shackle assembly which may be readily assembled and disassembled and wherein the moving parts are efficiently lubricated at all times.

With the above and other objects in view which will appear as the description proceeds, my invention consists in the novel features hereinafter set forth, illustrated in the accompanying drawing and more particularly pointed out in the appended claims.

Referring to the drawing in which numerals of like character designate similar parts throughout the several views, Fig. 1 is a plan view of one form of spring shackle assembly embodying my invention, one end of said assembly being shown in section.

Fig. 2 is a sectional view taken on line 2—2 of Fig. 1.

Fig. 3 is a view similar to Fig. 1, showing a modified form of assembly, and

Fig. 4 is a sectional view taken on line 4—4 of Fig. 3.

In the drawing, referring first to Figs. 1 and 2, numerals 1 and 2 represent shackle bars which extend between the eye of the hanger 3 on an automobile chassis and the eye of the spring 4. An internally threaded sleeve 5 is driven into each of the eyes 3 and 4 and extends slightly beyond the extremities thereof. As shown in section in Fig. 1, the opposite ends of the sleeve 5 are adapted to receive hollow threaded pins 6 which terminate at their outer extremities in enlarged roller bearing housings 7.

The shackle bars 1 and 2 carry integral bearing hubs 8 at each end which are adapted to fit into the respective housings 7, a cluster of roller bearings 9 being interposed in the annular space between the walls of the housings 7 and the peripheries of the hubs 8. One of the shackle bars is preferably provided with a lubricating fitting 10 which communicates with the hollow portion of the pins 6 through a port or conduit 11, and each of the hubs is provided with a plurality of radial ports leading to the respective clusters of roller bearings, whereby grease introduced through the fitting 10 is conducted to each of the roller bearings. In order to prevent leakage of lubricant, I preferably provide a sealing arrangement between the open ends of the housings 7 and the inner faces of the shackle bars 1 and 2. As shown in the drawing, this consists of a metal cap 12 and a metal ring 13 having a felt or cork washer 14 interposed therebetween. It is also desirable to employ a suitable clip washer 15 between the shoulder of each of the housings and the adjacent end of the sleeve 5.

The assembly is secured in place by means of a transverse central bolt 16 which extends through the opposite shackle bars 1 and 2 and is locked in place by suitable nuts 17 and 18 as shown.

Referring to the modification shown in Figs. 3 and 4, it will be seen that the shackle bars 1a and 2a are provided with integral roller bearing housings 19 adapted to receive the reduced bearing ends 20 of pins 21 which fit tightly within each of the eyes 3a and 4a of the hanger and spring, respectively, of the automobile. As in the other case, a cluster of roller bearings 9a is interposed between the bearing end 20 and the wall of the housing 19.

One of the shackle bars is preferably provided with a lubricating fitting 10a adjacent one end of the pin 21 and said pin is drilled longitudinally to form a main lubricating channel 22 which is arranged in communication with each of the roller bearing housings by radial ports 23. A suitable packing member 24 is interposed between each end of the eyes 3a and 4a and the adjacent ends of the respective roller bearing housings 19.

The assembly is secured together by a transverse bolt 16a and nuts 17a and 18a which extends through the central portions of the shackle bars as in the other embodiment of my invention.

From the foregoing it is believed that the construction and advantages of my improved shackle assembly may be readily understood by those skilled in the art without further description, it being borne in mind that numerous changes may be made in the details disclosed without departing from the spirit of my invention as set out in the following claim.

What I claim and desire to secure by Letters Patent is:

In combination with the spring and hanger of a vehicle chassis, a shackle assembly comprising a pair of internally threaded sleeves engaging the eyes of the spring and hanger, respectively, a pair of oppositely disposed threaded bolts cooperating with the threads of each of said sleeves, an enlarged housing member on the outer end of each of said bolts, a pair of shackle bars, adapted to cooperate with respective housing members on the ends of said bolts, hub members on said shackle bars adjacent each end of the latter, each of said hub members being coaxial with the respective housing member and spaced radially from the latter to form an annular needle roller chamber at each end of said bolts, a cluster of needle rollers in each of said chambers, means for lubricating said needle rollers, and means for securing said shackle bars in place.

JAMES H. ROBERTS.